(12) United States Patent
Lestruhaut

(10) Patent No.: US 6,653,990 B1
(45) Date of Patent: Nov. 25, 2003

(54) SYSTEM FOR DISPLAYING REALISTIC VIRTUAL THREE-DIMENSIONAL IMAGES IN REAL TIME

(75) Inventor: Olivier Lestruhaut, Labege Cedex (FR)

(73) Assignee: Societe Rasterland S.A., Labege Cedex (FR)

(*) Notice: Subject to any disclaimer, the term of this patent is extended or adjusted under 35 U.S.C. 154(b) by 0 days.

(21) Appl. No.: 09/623,639

(22) PCT Filed: Mar. 8, 1999

(86) PCT No.: PCT/FR99/00517

§ 371 (c)(1),
(2), (4) Date: Oct. 23, 2000

(87) PCT Pub. No.: WO99/45503

PCT Pub. Date: Sep. 10, 1999

(30) Foreign Application Priority Data

Mar. 6, 1998 (FR) .......................................... 98 02768

(51) Int. Cl.[7] ................................................ G09G 5/00
(52) U.S. Cl. ...................................................... 345/8
(58) Field of Search ............................ 345/7, 8, 9, 419, 345/418, 426, 629, 630, 634, 638; 359/13, 14, 630; 348/42, 47, 48, 51, 52

(56) References Cited

U.S. PATENT DOCUMENTS

| | | | |
|---|---|---|---|
| 4,645,459 A | 2/1987 | Graf et al. | |
| 4,970,666 A | 11/1990 | Welsh et al. | |
| 5,394,517 A | * 2/1995 | Kalawsky | 345/632 |
| 5,432,895 A | * 7/1995 | Myers | 345/419 |
| 5,566,073 A | 10/1996 | Margolin | |
| 5,579,165 A | 11/1996 | Michel et al. | |
| 5,625,765 A | 4/1997 | Ellenby et al. | |
| 5,815,411 A | * 9/1998 | Ellenby et al. | 702/150 |

FOREIGN PATENT DOCUMENTS

| | | |
|---|---|---|
| EP | 0700018 | 3/1996 |
| EP | 0753834 | 1/1997 |
| EP | 0817133 | 1/1998 |

* cited by examiner

Primary Examiner—Chanh Nguyen
(74) Attorney, Agent, or Firm—Young & Thompson

(57) ABSTRACT

The invention concerns a device for displaying computer-assisted realistic virtual three-dimensional images, and pictured by computerisation into a real environment, characterised in that it comprises in combination: means for detecting and monitoring in real time the user's position in the geographical site for implanting the virtual objects, relative to an arbitrary reference point; means for detecting and monitoring in real time the position of the users' field of vision (top, bottom, right, left) relative to a reference point located with respect to the user, video means for capturing and monitoring in real time the images perceived by the user, means for computing virtual images in real time taking into account the user's position and the field of vision previously detected; means for mixing the resulting computed virtual video image previously captured, such that the virtual image is pictured on the video image realistically and non-transparently. The aim is to transmit towards individual and portable display means the image thus computed, combining the real external landscape and the images of virtual objects, to a moving user.

14 Claims, 3 Drawing Sheets

SYSTEM FOR DISPLAYING REALISTIC VIRTUAL THREE-DIMENSIONAL IMAGES IN REAL TIME

BACKGROUND OF THE INVENTION

1. Field of the Invention

The invention presented here is in the field of systems for displaying realistic, virtual three-dimensional images in real time.

2. Description of the Related Art

Many devices for the display of realistic and virtual-reality images are known from the prior art. In particular, systems for flight simulation contain a database of geographical information, corresponding to real or invented landscapes, and the software renders an image corresponding to the user's position at a given instant relative to the base elements.

The European patent EP 0817 133 A (issued to SUN MICROSYSTEMS INC.) describes a system that allows the display of virtual objects in the real environment. The system contains a screen, a camera, a system for positioning by telemetry and a system for calculating the virtual image in two dimensions relative to the real environment. The image calculated in this way is then superimposed on the image taken by the camera.

This system has certain limits notably with regard to the system of telemetry, in fact, this type of locating system does not allow certain applications in large spaces with precise positioning.

On the other hand, this display system is completely isolated and does not allow any interactivity with other similar devices. In fact, the storing of the position of the object is contained in the internal memory of the system. This aspect limits the realism of the system since only one user can display the object, move it, and observe it in another position. Each user thus navigates among his own virtual objects and totally ignores those of the others. This system thus does not allow the creation and the display of a virtual environment shared among many users superimposed on the real environment in a manner common to all users.

The U.S. Pat. No. 5,556,073 (issued to Margolin) describes a system to help in piloting. The system consists of a OPS that makes it possible to determine the position of the airplane. A database contains a virtual representation of the environment of the airplane. As a function of the position of the airplane, it is thus possible to display the virtual environment without being concerned with the real environment. The display of the environment can be done using a display helmet. This type of system does not make it possible to superimpose a virtual environment on the real environment, but just allows the substitution of the real environment with a virtual environment that takes on the characteristics of the real environment.

The U.S. Pat. No. 4,970,666 (issued to Welsh et al.) describes a system for representing virtual images in a real environment. The images of the real environment are numbered and then the representation of the virtual image is positioned relative to the numbered image. The two images are then superimposed. This type of system only makes it possible to process fixed images but not to simulate a virtual object in recalculating its image as the user is moving and in superimposing this image on the real environment. On the other hand, this system makes it possible to add lighting effects to the image, for example. Once again, this operation is very easy in the case of fixed images, but becomes very complex in the case of a moving user where the images must be constantly recalculated.

The U.S. Pat. No. 5,625,765 (issued to Ellenby et al.) describes a system that makes it possible to improve the resolution of enlarged images by computer. The real images from one scene can be enlarged using the information contained in the computer which reproduces the real scene. Given that the resolution of the models contained in the computer is not limited, the system can present an enlarged image without restriction. The image produced by the computer and the real image are combined in order to form an enlarged image from the user's point of view. This type of system is restricted to the improvement of the resolution of real images and does not allow the superimposing of a virtual environment which represents movable virtual objects and whose position is shared among several users, onto a real environment.

The U.S. Pat. No. 5,579,165 (issued to Michel et al.) describes an optical system that makes it possible to superimpose a virtual image onto a real image. The virtual image can be a symbolic image that comes from a map. This patent is limited to the optical device for the superimposing of images but does not describe its applications precisely. It is thus not possible from the elements of this patent to make an application involving the creation of a virtual interactive environment that is superimposed on the real environment.

BRIEF SUMMARY OF THE INVENTION

The purpose of the invention presented here is to propose a mobile system for displaying virtual three-dimensional images inlaid on a background of a real environment, capable of following the movements of one or more users in real time and showing the results of its interactions in real time. The goal is to offer to each user the display of a virtual interactive environment superimposed on their real environment. The virtual environment can be shared by all users, each user perceiving it according to his point of view and certain elements of the virtual environment being able to be displaced by each user, the other users perceiving this movement in real time.

The device that is the object of this invention is thus a device for displaying realistic three-dimensional images calculated by computer, and inlaid by computer in the real environment. It contains at least one individual and portable device for capturing the real images perceived by the user (camera), a device for memory of the characteristics of the virtual objects to be displayed, a device for memory of the planned position of these objects in a real geographic environment, a device for following the user's position, a device for following the user's field of vision (head movements), a device for inputting the user's commands, a device for calculation by computer including software for calculating images and which ensures the synthesis in real time of all of the devices cited above, and an individual and portable device for displaying the images calculated in this way, in a manner so that they are perceived three-dimensionally by the user, characterized in that it contains a combination of:

- a mechanism for detecting and following in real time the position of each user in the geographic site for layout of the virtual objects relative to an arbitrary point of reference,
- a mechanism for the detecting and following in real-time the position of the field of vision of each user (high, low, right, left) relative to a point of reference located on each user, a video mechanism for capturing and following in real-time the images perceived by each user, a database shared by all users containing the positions of each virtual object and storing their possible movements, a mechanism for calculating virtual images in real-time taking into account the position and the field of vision of each user previously detected, a mechanism for mixing the virtual image calculated in this way with the video image captured previously, in a manner so that, for each user, the virtual image is inlaid on the video image in a realistic and non-transparent manner; where the purpose is to send to each user equipped with a mechanism for individual and portable display, the image that is calculated in this way, combining the real outside landscape and the images of the virtual objects whose positions are shared by all of the users but displayed by each user at a different angle.

It is understood that using this device, the user will be able to simulate the implantation of an object such as a building, traffic circle, work of art, etc., into the real site planned for its implantation, with an extreme realism, thus making easier its decision making with regard to the different options of a project. This indeed involves a new manner of seeing and perceiving the space for users: they no longer go to the computer, but the computer comes to them in becoming integrated into their field of vision.

Also by this device, one can get around the absence of believability that occurs when numerous people are faced with the images presented on the video-type screen where the landscape, which has been numerically recalculated, appears in a style that is indisputably artificial (angular, jerky, few shades of colors, no natural movements, etc.). Here, the real image of the landscape is retained, since this involves a video retransmission, and a calculated virtual image is added, thus making easier its acceptance by the public. In fact, the familiarity that one experiences with the display of a video image renders more credible the integration of the plotted virtual image, which will then no longer only represent a small area of the global image.

According to a particular arrangement, the mechanism for the detection in real-time of the position of the user in the geographic site of the implantation of the virtual objects has the form either of a GPS system (global positioning system) by satellite link, containing a fixed station and mobile stations (backpacks weighing less than 4 kg), or tracking video cameras, whose position is known precisely.

This device contributes to implementing the invention with the help of simple mechanisms that are already known.

The description that follows, made with regard to the attached drawings for the purpose of explanation and in no way restrictive, makes it possible to better understand the advantages, goals, and characteristics of the invention.

DETAILED DESCRIPTION OF THE INVENTION

Figure 1:
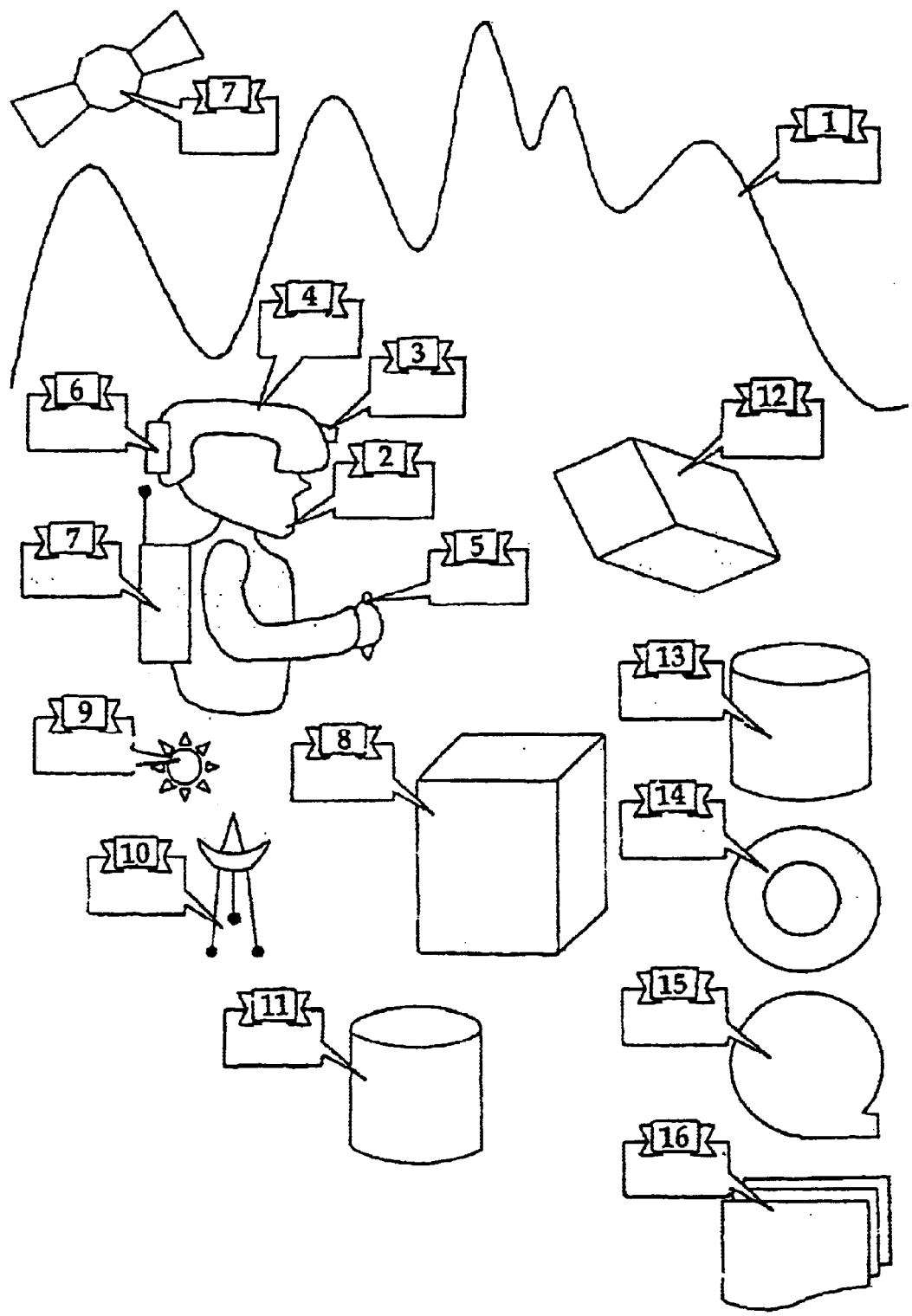
FIG. 1 is a schematic view of the main elements of the invention.
Figure 2:
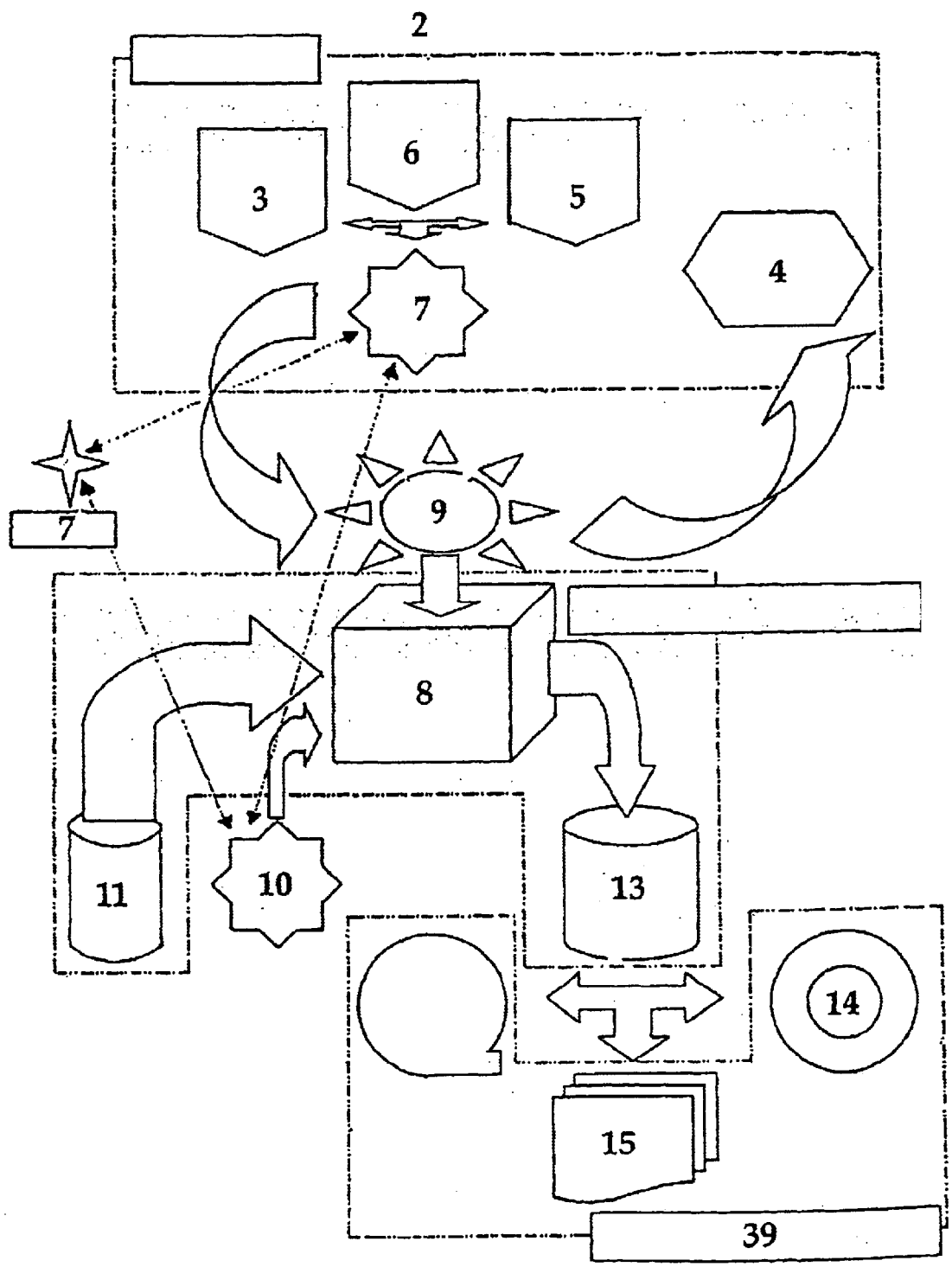
FIG. 2 is a schematic view of the different functional elements.

As shown in FIG. 1, the device for on-the-spot image immersion of the virtual interactive georeference imagery in real-time in a given geographical environment (1) consists of the following main sub-assemblies: for each user (2) a video camera (3), a helmet for the display of virtual images (4), a joystick (5), a tracker for head movements (6), and a GPS (Global Positioning System) mobile antenna (7) linked to one or more satellites (7), wherein the entire assembly sends its data to the central processor (8) by a wireless channel (9).

The central processor (8) (microcomputer) also receives the data from the fixed GPS antenna (10), uses the database of the virtual objects (11), and calculates a final composite image sent back to the helmet (12).

This image, or a sequence of images, can be saved via an ultra-rapid hard disk (13), in the form of a CD (14), video cassette (analog or digital) (15), or sent towards a peripheral printer (16).

Figure 3:
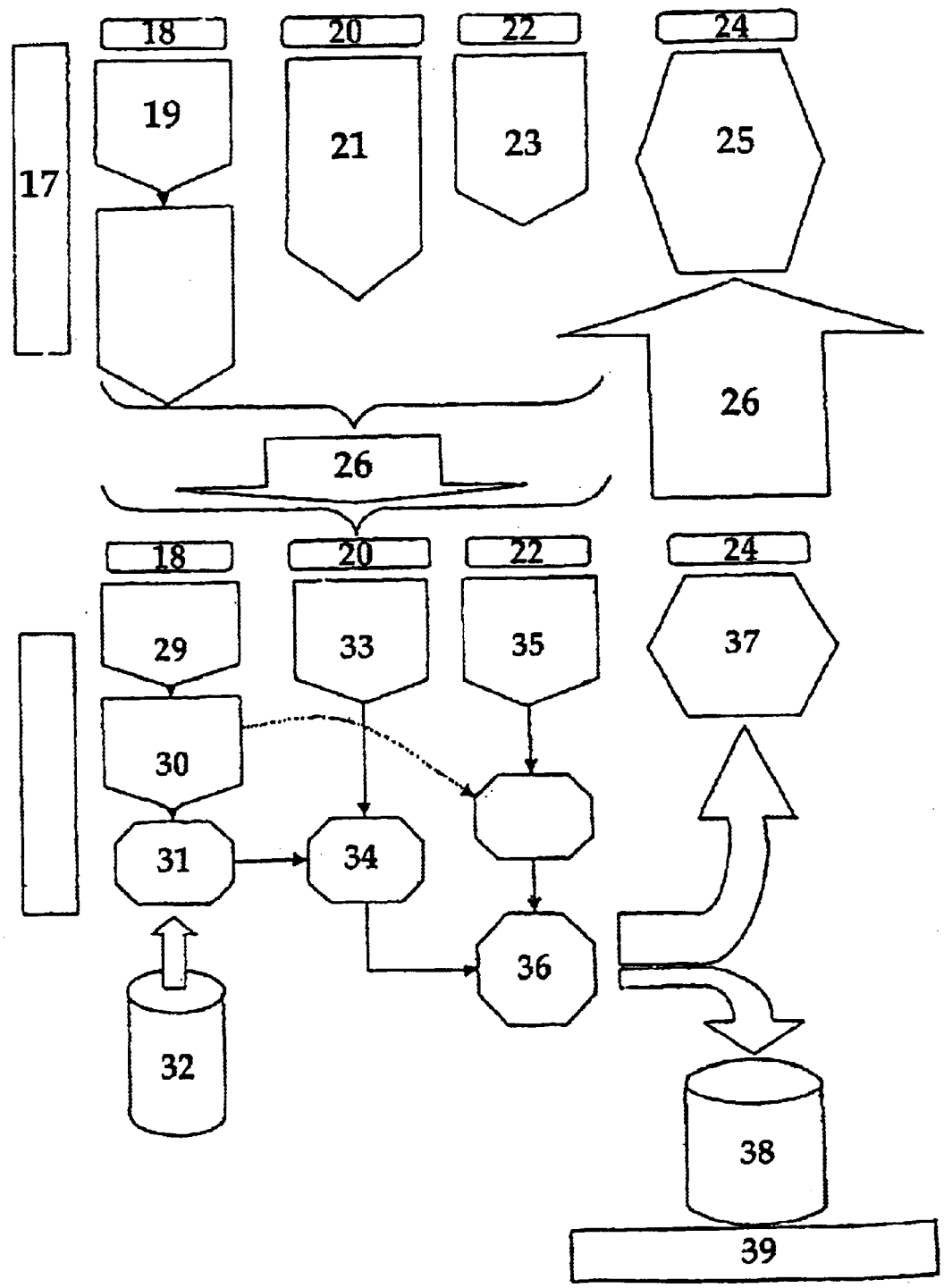
FIG. 3 is a diagrammatic illustration of the architecture of the system.

The architecture of the system is organized according to the diagram of FIG. 3 in which the reference (17) indicates the user part with the position (18) defined by the head tracker (19) and the GPS mobile (19'); the interaction (20) with the joystick (21); the real site (22) with the video camera and the restitution (24) for the user with the virtual helmet (25) from the computer part (28) by wireless transmission (26).

From the user reference (17) by wireless transmission (27), the elements are transmitted to the computer (28). The computer (28) contains the following information:

The position (18): with a GPS at a fixed position (29) with processing of the position (30), calculation of the virtual image (31) according to the valid point of view and a database (32) of virtual objects. The database (32) contains the position and the characteristic parameters of each virtual object. This database (32) is centralized i.e. all of the users have the view of a same virtual environment presented to each of them according to his point of view.

The interaction (20): with the analysis of the interaction (33), and calculation of the virtual modified image (34), The real site (22) with real-time capture of the video image (35) and the mix (36) of the video image and the virtual image, the result obtained being directed by the restitution (24) by a video transmitter (37) and towards the hard disk (38) with output peripheral (39).

At the level of the user (see FIG. 1), the positioning function is articulated around the GPS mobile (7) which makes it possible to determine the position of the user on the terrain relative to an initialization reference. The information data (x, y, z) is sent by wireless communication to the computer.

There is a real-time dialogue of the device with the satellites with a fixed position.

The head tracking device (4) enables the determination of whether the user is looking up, down right, etc.

The interaction function is ensured by the joystick (5), a device similar to a mouse but mobile in three dimensions so that it is possible for the user to interact with the virtual object displayed, according to several simple basic actions: move withdraw, pivot, expand, or shrink, change the colour. The new data relative to the virtual object modified are taken into account in the database (32).

The screens inside the virtual helmet (4) are managed like a standard screen. It can thus make simple pull down menus appear at your convenience, for example, those of the WINDOWS 95 (TM) type.

At the real site, the video camera (3) placed on the user's helmet films an image of the site which corresponds to his field of vision. The image is sent by wireless communication in real time to the data capture card of the computer.

The re-creation is done, from the computer, on the virtual helmet by wireless transmission. The virtual helmet is equipped with two LCD screens, one per eye. This makes it possible for the user to see the final image in monoscope or stereoscope (the right and left images are slightly different) in order to accentuate the depth effect. The system offers a perfectly fluid monitoring of the movements and of the user's movements in real-time.

All of the data of the user level is transmitted to the computer by wireless transmission. At the computer level, the position function is ensured by the fixed GPS (10) which determines the position of the user on the terrain in comparison with the satellites and with the mobile station, all of which is in real-time.

The processing of the position which enters into the calculation of the virtual image is done by compilation of the displacement data (x, y, z) and the viewing angle, this compilation making it possible to calculate the virtual image according to the valid point of view. A database of virtual objects (11) occurs at this level.

The analysis of the interaction is done by taking into account several simple, basic actions: move, withdraw, pivot, expand, or shrink, change the colour, etc. which are done by the user. The calculation of the virtual image and the interaction contribute to obtaining the modified virtual image.

From the position "real site", the data capture in real time of the video image is done. The data capture card will synchronize the video image and the modified virtual image. This mixing will then be saved at once and recreated at the level of the user's virtual helmet.

The device for on-the-spot image immersion of the virtual, interactive georeference imagery in real-time is designed to display an object or a database of virtual objects. This computer data can be either supplied by the final client, or created from paper plans. In any case, they must have the following characteristics.

The initial structure of the object(s) to be displayed is of the three-dimensional wireframe type. The object is to be created and divided in sub-assemblies corresponding to the different materials that make it up, since the display must simulate the visual aspect of this material during the visualization. For each of these sub-assemblies, a dense frame of lines is designed and a code is assigned. On this frame, the image simulating the material comes to be wrapped, so as to closely follow the shape. This image that is chosen is a function of the code. If no database exists, the creation will be made according to the process of automatic vectorization.

In a first phase, the paper plan of the objects to be displayed is digitized by using a high-resolution optical scanner of the known type, linked to a computer of the PC type, which stores the digitized plans in memory. The file that is obtained in this way contains a large number of black and white points, which are aligned in the order recorded by the machine, forming the image of the original plan, in the manner of a photocopier. The elements designed by these points do not have any substance, they don't exist as far as measurable, quantifiable or differentiable entities by geometric criteria. These points provide information on the position of the elements relative to each other, but not on their nature (circles, texts, etc.). This type of image is known under the name of raster image or bitmap image.

The plan is then vectorized using a software parameterized as a function of the types of data acquired. This operation consists in placing, on the lines, black points of the digitized plan of vectors, mathematical entities defined by the coordinates (lines, polygons, circles, etc.), and no longer by a juxtaposition of points. Each entity can be seen attributing individually to the characteristics of the display (colour, thickness, etc.). It is thus possible to structure the plan by elements, and to class them by family (buildings, roads and railroads, plots of land, for example).

Certain graphic elements are not recognized or are recognized poorly by the vectorization software, and must thus be corrected manually by known methods of data capture, with the computer-aided design software of the known type (Microstation(R), AutoCAD(R), for example).

At the output of this phase, the output plan is transformed into a data file containing all of the original data, classed by layers (buildings, roads and railroads, plots of land, for example) in the manner of a notepad of transparent sheets. Thus, you can at your convenience only display certain elements while maintaining their exact position.

The next phase is that of the georeferencing.

Due to the vector nature of the file obtained in this way, each entity can, individually or in a group, be put in scale, in a manner so that its computer dimension becomes its real field dimension in scale 1, and no longer a paper dimension, and then moved and oriented so that its coordinates then reflect its exact geographical position in a given reference (UTM, Lambert system of coordinates, etc.).

Two goals have thus been reached:

The accuracy of the dimensions:

Any dimension read on the computer file is the real dimension of the measured object. A user can thus verify on the terrain, if there is a need, the accuracy and the tolerance of the original documentary material, or confirm the validity of the process.

The determination of the unique geographic site in a given reference.

For example, the coordinates x=564224.25 and y=178206.43 in the Lambert III south system of coordinates designates the center of the Saint-Jean church in Gaillac (81). The precision, in the scale of a village, for example, is on the order of a millimeter . Thus, a geographic computer file has been created which contains all the information of the original documentary material, but exists only in two dimensions (plane).

The next phase is then to add a dimension of elevation to the elements contained in the computer file in a manner so that they appear as volumes. In order to do this, it is necessary to allocate an elevation coordinate z to each graphic element.

For objects that are simple or intended to appear in the background, this operation can be done in an automatic manner, by adding a random elevation defined by certain categories of elements. For example, a user could decide to allocate a random elevation of between 4 and 6 meters in a section of 50 cm to all elements of the buildings family.

For projects that require a larger precision, you can also allocate to each building its real height, if it has been read in the field by geometry This allocation is done manually.

In certain scenarios, the vectorization phase will not take place, and the object(s) is(are) directly created from a known modeling program. We have given several examples here in order to explain the phases of creation of a database of virtual objects, but we would like to recall that in the frame of the display device of the invention, only objects that do not exist at the real site will be the object of this type of modeling.

The phase of covering the elements representing the geometrical elements is done from a first wireframe representation on the computer. The database of virtual objects is at this stage made up solely of wireframe structures. A little in the manner of mannequins, they will be dressed in digitized images in a manner so as to recreate the illusion of their material. Two known techniques are used:

The juxtaposition of many small identical images recreates by optical illusion the appearance of the materials such as wood, stone, concrete, etc. You could also recreate the appearances that are more worked such as walls of bricks, fences, rough plasters, etc. The library of all available material appearances is saved in memory in the computer, and can be constantly improved. It will be loaded in the memory of the graphics card at the moment when the device is initialized.

The digitized photograph of an existing environmental element (façade of furniture, for example) or a part of this element (entrance doors, window, etc.) is wrapped on the wireframe structure of the virtual object. This more economical process makes it possible to recreate a display of everyday objects without having to "construct" them by computer. Thus, in order to model a carriage entrance in a realistic manner, it is necessary to break it down into its door frame and its leaves (sides), then to separate the frame and the panels and so on. With the mapping, the design of a rectangle is sufficient.

The re-creation of the light effects, the shadows and the reflections is indispensable to the realism of a virtual object. The term used is image rendering. The algorithms used, such as Gouraud or Phong, are customary for the professional. As long as it is not the object of an invention, the rendering engine will be developed specifically for the device, in order to meet the requirements for speed and especially, interaction.

This re-creation takes into account the origin of the light and the positioning of the objects relative to each other. The taking into account of the real position of the solar light at a given instance of the day is possible, as is its progression, which accentuates the impression of integration of the buildings in the real landscape.

The software part monitoring this function is called the rendering engine. The calculation of the restitution of the textures and the lighting effects in real-time is done by dedicated graphics cards integrated within the microcomputer. Numerous cards known to the professional are suitable for this task.

The use of this database is done as follows:

The portrayal comprises using a computer to place virtual objects so that they will be displayed on the real site. Using the georeferencing, this portrayal thus comprises the allocation of coordinates to the different virtual objects, in the same geographic reference as that of the site involved.

Once rendered on the site, the users will have to put on a helmet and backpack, then initialize them. This means merely that they must turn on their equipment at a place that is arbitrarily chosen at the site, but identical for all users. This place will be named "point O" or the reference point, and it is from it that their movements will be quantified.

The monitoring of the user's movements is done using the position and altitude sensors of the G.P.S. (global positioning system). This device is known from the prior art. The monitoring of the user's field of vision is ensured by a movement detection device integrated into the display helmet, named the tracker device. This device is known from the prior art. A simple program then determines from the data the position and the angle according to which the image of the virtual object is calculated so that it is perfectly integrated in the user's field of vision.

The display of the images seen by the users is done using the display helmets customary in virtual reality. These helmets contain two liquid crystal screens (one in front of each eye). These screens can display two images that are very slightly different, which leads the user to a reinforced impression of the three-dimensional image. This is a known process called stereoscopic restitution.

The user is equipped with a joystick which will enable him to make several basic interactions on the object which is being displayed. He will thus be able first to withdraw, move, cause to pivot, expand, shrink, or change the color of the objects he sees, and especially to instantaneously observe the result of his interaction, while conserving the fluidity of the display and the implantation in the real site.

The device is completed by a safeguarding device that can be activated on time and continuously, and which makes it possible to keep track of the combination virtual image/site image. You can thus archive several possibilities for placements or colour for the virtual object(s) and print or display them a posteriori by means of traditional computer peripherals known in the state of art (printers, CD) or by video (analog or digital video recorder).

As has been seen in the description, the device according to the invention makes it possible for the decision-makers to develop physically within studies or projects, to better understand the impact of the work planned in the environment, and in space. It also makes it possible to test in real time the options or the hypotheses and to instantaneously appreciate the impact. The real-time, in addition to a great usage comfort, also adds a certain economic advantage, as the study of a variation would require, days, or even weeks beforehand, preparations and calculations in order to present a new project. Using the device according to the invention, hypotheses that one wouldn't dare to imagine for economic reasons, can be made without additional cost.

The desired result is the reduction of the decision durations, a better perception of the possible disparities between the theory of the project from the point of view of the reality of the site, in particular for people who do not have a good abstract thinking skills, and finally, the elimination of limitations on the hypotheses, due to the costs of the study. The real time and the interaction makes it possible for an unlimited number of repeat trials, which themselves make it possible to better approach the best solution, or the best consensus.

One variation consists of replacing the G.P.S. system for monitoring the user by tracking video cameras of the type known from the state of the art, which can recover the positioning data on the micro-computer. This system for tracking is markedly less precise and has a lesser radius of action, but can make it possible to supply a system at a more affordable cost for the applications in the restricted perimeter (approximately 400 m2).

In another variation, the database of the objects to be displayed is linked to the alphanumeric data characterizing each of the elements, for example, their implementation cost. It is thus easily possible, as a function of the configuration displayed at a given instant, to display simultaneously at one angle of the screens of the virtual helmet, the global price information, which develop as the hypotheses are tested.

By extension, all variations result from the software connection or the computer and semi-computer materials known to the device.

The range of the invention presented here is not limited to the embodiment modes presented, but, on the contrary, extends to the perfections and modifications within the grasp of one skilled in the art.

What is claimed is:

1. A device for displaying realistic three-dimensional images to a plurality of users, comprising:
- a database shared by all the users storing visual characteristics and positions, in a real geographical environment, of each one of a plurality of virtual objects;
- for each one of the plurality of users,
- a video camera for providing at least one image of a real geographical environment,
- a positioning device for determining the user's position,
- an orientation device for determining the user's field of view,
- a computer for calculating an image for a right eye of the user and an image for the left eye of the user,
- each calculated image representing an image provided by the camera in which the virtual objects are inserted based on the visual characteristics and position of the virtual objects provided by the shared database, the position of the user and the field of view of the user, and
- a display that displays each of the images calculated by the computer, each virtual object being inserted in the images displayed by the display of each user at an angle depending on the respective position of said user and of said virtual object.

2. A device according to claim 1, further comprising, for each user, a helmet comprising the display that includes a screen positioned in front of each eye of the user.

3. A device according to claim 1, wherein the positioning device comprises a receiver that receives signals from earth satellites.

4. A device according to claim 1, wherein the positioning device comprises tracking video cameras in the geographical environment, the position of the tracking video cameras being precisely known, and a computer that processes images provided by the tracking video cameras to determine the position of the user in the geographical environment.

5. A device according to claim 1, further comprising a scanner for scanning a map of the geographical site and providing a scanned image.

6. A device according to claim 5, further comprising a vectorization device that vectorizes the scanned image.

7. A device according to claim 5, further comprising a georeferencing device that provides two-dimensional geographical references to the scanned image.

8. A device according to claim 7, further comprising an elevation device for providing a geographical reference in a third dimension to the two-dimensional geographical references.

9. A device according to claim 1, further comprising a sun position detector that determines the position of the sun, the computer calculating images including lighting effects taking into account the position of the sun.

10. A device according to claim 1, wherein the computer calculates images that are representative of at least one parameter representing a configuration of the device for displaying realistic three-dimensional images.

11. A device according to claims 1, further comprising an input device for inputting user's commands.

12. A device according to claim 1, wherein the database stores data representing at least one movement of at least one virtual object.

13. A process for displaying realistic three-dimensional images to a plurality of users, comprising:
- for each one of the plurality of users,
- a step of reading, in a database shared by all the users, visual characteristics and positions, in a real geographical environment, of each one of a plurality of virtual objects,
- a step of providing at least one image of a real geographical environment,
- a step of determining the user's position,
- a step of determining the user's field of view,
- a step of calculating an image for a right eye of the user and an image for the left eye of the user,
- each calculated image representing an image provided by the camera in which the virtual objects are inserted based on the visual characteristics and positions of the virtual objects, the position of the user and the field of view of the user,
- each virtual object being inserted in the images displayed by the display of each user at an angle depending on the respective position of said user and of said virtual object and
- a step of displaying each of the images calculated by the computer.

14. A computer readable medium having embedded thereon a computer program for causing a computer to:
- display realistic three-dimensional images to a plurality of users, comprising,
  - the computer program reading, in a database shared by all the users, visual characteristics and positions, in a real geographical environment, of each one of a plurality of virtual objects,
  - providing at least one image of a real geographical environment,
  - determining the user's position,
  - determining the user's field of view,
  - calculating an image for a right eye of the user and an image for the left eye of the user, each calculated image representing an image provided by the camera in which the virtual objects are inserted based on the visual characteristics and positions of the virtual objects, the position of the user and the field of view of the user, each virtual object being inserted in the images displayed by the display of each user at an angle depending on the respective position of said user and of said virtual object and
  - displaying each of the images calculated by the computer.

* * * * *